E. T. MILLER.
STEERING AND COUPLING DEVICE FOR PLOWS.
APPLICATION FILED JAN. 29, 1921.
1,391,963.
Patented Sept. 27, 1921.
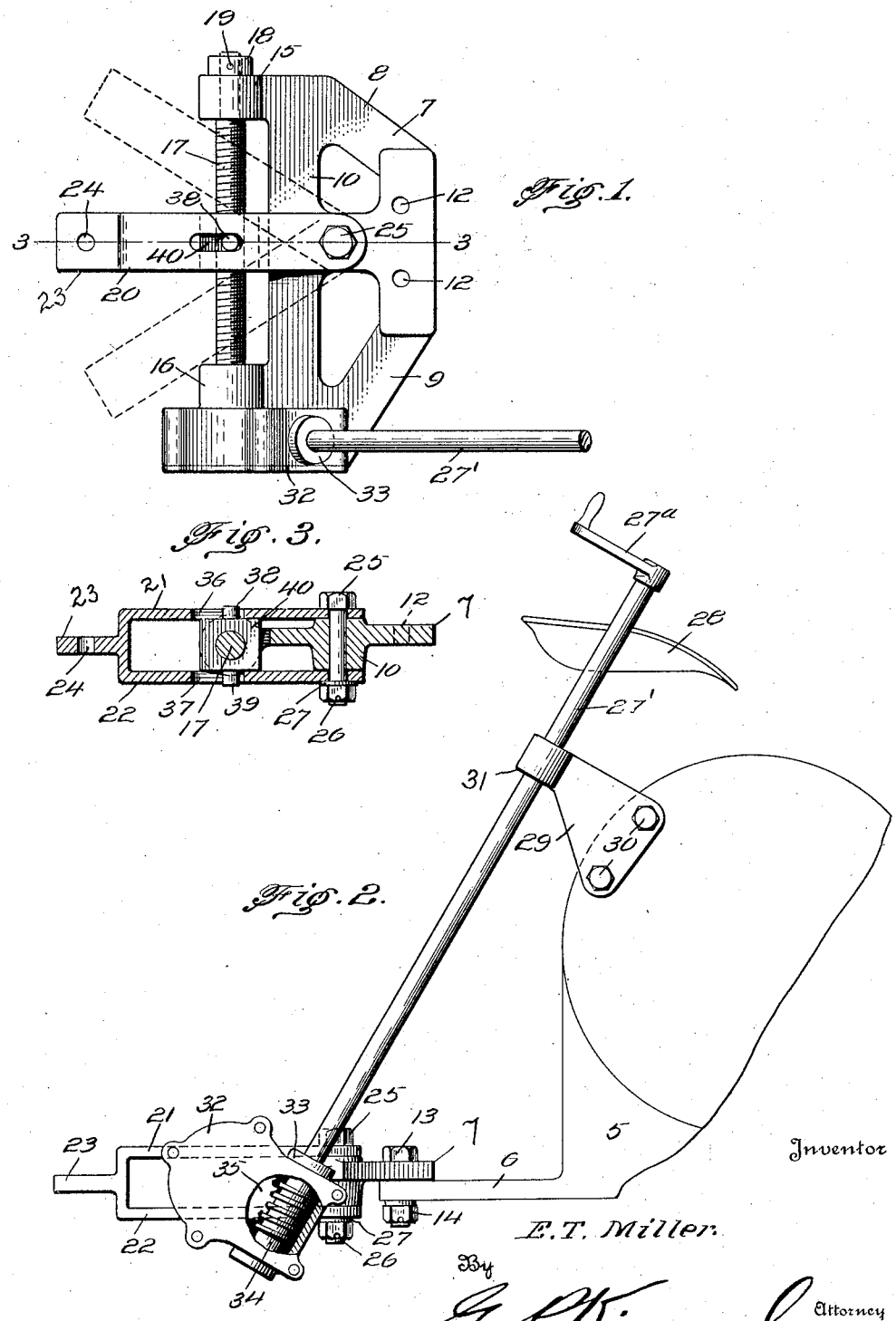

UNITED STATES PATENT OFFICE.

EDGAR T. MILLER, OF GREENSBURG, PENNSYLVANIA.

STEERING AND COUPLING DEVICE FOR PLOWS.

1,391,963.  Specification of Letters Patent.  Patented Sept. 27, 1921.

Application filed January 29, 1921. Serial No. 441,008.

*To all whom it may concern:*

Be it known that I, EDGAR T. MILLER, a citizen of the United States, residing at Greensburg, in the county of Westmoreland and State of Pennsylvania, have invented certain new and useful Improvements in Steering and Coupling Devices for Plows, of which the following is a specification.

This invention relates to a combined steering and coupling device for plows, tractors and the like and more particularly is directed to an attachment capable of use in connection with various types of machines to regulate the angular draft of a plow, drag, trailer or other similar devices over a field or along the ground.

The primary object of the invention resides in the construction of a new and improved form of coupling and steering mechanism therefor whereby the angular pull thereof may be automatically regulated from a position on a tractor at the will of the operator.

Another object of the invention relates to an attachment of the type above set forth wherein the coupling is provided with a novel form of steering mechanism and draw bar to which various types of implements may be attached to be drawn over a field and the angular pull thereof be regulated by the operator without dismounting from the tractor or device to which the invention is applied.

Another and very important object of the invention resides in the novel construction and arrangement of a coupling and draft appliance therefor including steering mechanism for regulating the angular draft and which will be rigid and simple in construction, consisting of comparatively few parts therefor inexpensive to manufacture, capable of universal use for attachment to all types of machines and which will be positive in operation and otherwise conforming to and withstanding the rough usage to which devices of this character are subjected.

With these objects in view and others which will be manifest and suggested as the nature and purpose of my invention are revealed in the following specification and drawing, wherein I have shown a practical, yet preferred embodiment thereof, Figure 1 is a plan of the coupling attachment and draw bar connected thereto.

Fig. 2 is a side elevation showing the housing partly broken away and the steering mechanism.

Fig. 3 is a section taken on the line 3—3 of Fig. 1.

Referring now to the drawing and particularly to Fig. 2 thereof, I have shown my invention as applied to the rear of a tractor 5, having a horizontal flat portion 6 to which is secured a coupling device designated in its entirety by numeral 7. The coupling 7 which is somewhat triangular in formation has its arms 8, 9 connected by a central web 10 extending rearwardly of the horizontal portion 6 of the tractor, apertures 12 being provided medially of said coupling device for attachment by securing bolts 13 and locking nuts 14 through the horizontal portion 6 as clearly shown in Fig. 2 of the drawing. The angular arms 8, 9 terminate in horizontal bearings 15, 16 which receive an extended adjusting screw or element 17 therein which is prevented from lateral movement by a collar 18 adapted to be retained by a cotter pin or other fastening element 19 outside of the bearing 15.

Centrally of the coupling device 7, I have provided a draw bar 20 consisting of an upper and lower section 21, 22 terminating in a front connecting portion 23, which as shown is apertured at 24 to receive a connecting pin or other suitable device whereby a plow, trailer, drag or other form of implement may be attached to the coupling and drawn over the field or ground as is well understood. The draw bar is adapted to straddle the adjusting screws 17 and the coupling device 7 and the upper and lower sections of the said draw bar are connected by a fastening element 25 which passes through the enlarged web 10 and retained by a nut and washer 26, 27, as clearly shown in Fig. 3 of the drawing. The fastening member 25 forms a pivot for the draw bar so that the same may swing either to the left or right as shown in dotted lines in Fig. 1.

The steering mechanism proper comprises an angularly directed steering post 27', having an operating crank 27ª, normally positioned to the right of a seat 28 and held securely in position by a bracket 29, secured by bolts 30 to the differential housing of a tractor for instance, said bracket having the usual bearing portion 31 for securely holding the steering post as clearly shown in Fig. 2 of the drawing.

The coupling device is provided with a housing 32 at one side thereof which receives the lower terminal of the steering post which as shown passes through a bushing 33 and is provided with a worm 34 for coöperation with a gear 35 on the end and rotatable with the adjusting screw 17 above described. The draw bar is provided with alined elliptical slots 36, 37 in its upper and bottom section which normally receives the studs or pins 38, 39 therein of a nut 40, said nut being permanently fastened to the draw bar and of course movable therewith and screw threaded on its interior surface to receive the adjusting screw 17. It will be thus seen that as the screw 17 is rotated the nut 40 will move along the thread and due to the elliptical slot will permit the draw bar to move in its angular position on its pivot as clearly shown in dotted lines in the drawing. The operator may of course rotate the steering post either to the left or right to make the proper angular adjustment and in each case, it will be readily apparent that the limit of movement of the draw bar is regulated by the elliptical slot in the upper and lower section 21, 22. By this construction, the angular pull of a plow, trailer, drag or similar device attached to the draw bar will be easily and more or less accurately regulated from its position on the tractor without dismounting therefrom permitting the devices to pass over or avoid such objects in the path of the machine as is desired. It will be also seen that the attachment lends itself to a multiplicity of uses and constitutes as a matter of fact an attachment which may be easily installed and removed without any unnecessary expense or particular skill.

In the accompanying drawings, I have illustrated my invention embodied in one form by way of example and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood, that the invention is not necessarily limited or restricted to the precise elements shown except in so far as such limitations are specified in the subject matter being claimed.

Having shown and described my invention what I now claim as new and desire to secure by Letters Patent of the U. S. is:

1. In a steering device of the class described comprising a coupling plate adapted to be connected to the rear of a tractor, a rotating member carried by said plate, a steering post and coöperating gearing at the lower end thereof for operating said rotating member, a draw bar straddling said member and pivotally connected forwardly thereof to the coupling plate, and means for angling said draw bar upon rotation of the steering post and said rotating member.

2. A device of the class described comprising a coupling plate adapted to be attached to the rear of a tractor, and having alined bearings formed therewith, a rotating element journaled in said bearings, a steering post and coöperating gearing carried thereby at its lower end for operating said rotating element, a bifurcated draw bar straddling said rotating element and pivotally connected forwardly thereof to said coupling plate, and freely movable means operable along said rotating element and engaging the arms of the bifurcated draw bar for angling the same with respect to said tractor upon rotation of the steering post.

3. In a device of the class described comprising a coupling plate adapted to be attached to the rear of a tractor and having alined bearings formed therewith, a rotating element journaled in said bearings, a steering post and coöperating gearing carried thereby at its lower end for operating said rotating element, a bifurcated draw bar having elliptical slots in its upper and lower arms loosely straddling said rotating element, said bar being pivotally secured to the coupling plate forwardly of the rotating element, a nut having studs thereon carried by the rotating element, and engaging the arms of the draw bar, and freely movable means operable along said rotating element and engaging the arms of the bifurcated draw bar for angling the same with respect to said tractor upon rotation of the steering post.

4. In a device of the class described comprising a triangular coupling plate adapted to be connected to the rear of a tractor and having rearwardly directed alined bearings formed integral with the arms of said plate, a rotating element journaled in said bearings, a steering post and coöperating gearings carried thereby at its lower end for operating said rotating element, a housing for said gearing at one side of the plate and adjacent one of the bearings, a bifurcated draw bar straddling said rotating elements and pivotally connected to said coupling plate forwardly of the rotating element, an internally threaded nut having studs thereon carried by and movable along the rotating element and adapted to engage the upper and lower arms of the draw bar for angling the same with respect to said tractor upon rotation of the steering post.

In testimony whereof, I affix my signature hereto.

EDGAR T. MILLER.